United States Patent

Peters et al.

[15] 3,671,432

[45] June 20, 1972

[54] PREPARATION OF SUPPORTED TRANSITION METAL OXIDE POLYMERIZATION CATALYSTS

[72] Inventors: Edwin F. Peters, Lansing; Omar O. Juveland, South Holland, both of Ill.

[73] Assignee: Standard Oil Company, Chicago, Ill.

[22] Filed: Oct. 23, 1969

[21] Appl. No.: 868,941

Related U.S. Application Data

[63] Continuation of Ser. No. 637,075, May 9, 1969, abandoned.

[52] U.S. Cl. ..........................252/467, 252/456, 252/458, 252/465, 252/464
[51] Int. Cl. ..........................................B01j 11/32
[58] Field of Search .................................252/430

[56] References Cited

UNITED STATES PATENTS

| | | | |
|---|---|---|---|
| 3,185,651 | 5/1965 | Bosc | 252/463 |
| 2,794,005 | 5/1957 | Lefrancois | 252/465 |

*Primary Examiner*—Daniel E. Wyman
*Assistant Examiner*—Philip M. French
*Attorney*—Pike H. Sullivan, Arthur G. Gilkes and Ralph C. Medhurst

[57] ABSTRACT

Polymerization catalysts are prepared by adsorbing water upon an inert support and extending a water-dispersible or soluble transition metal compound upon the support by mixing. The water is then removed and the transition metal compound converted to a highly oxidized state by calcination.

4 Claims, No Drawings

PREPARATION OF SUPPORTED TRANSITION METAL OXIDE POLYMERIZATION CATALYSTS

This case is a continuation of application Ser. No. 637,075, filed May 9, 1969 and now abandoned.

This invention pertains to an improved method for the preparation of catalysts. More specifically, it pertains to the preparation of catalytic compositions of transition metal oxides upon inert supports useful for the polymerization of unsaturated hydrocarbons.

It is known that ethylenically unsaturated compounds can be polymerized with transition metal oxides extended upon inert supports. Among such catalysts are chromium oxide on silica and vanadium oxide on alumina. Such compositions, optionally used with various promoters known to the art, e.g. aluminum and boron alkyls, aluminum sesquihalides, metal hydrides and alkali metals, are known for the preparation of polyolefins from terminal 1-olefins, e.g., polypropylene from propylene and polyethylene from ethylene.

A common technique for extending transition metal oxides on supports is to impregnate the support with a solution of a transition metal compound and then calcine the impregnated material. This technique often results in an increase in the bulk density of the composition by a packing and agglomerating of the support particles. This is sometimes undesirable, for we have found that particularly active catalysts are those which possess an exceptionally small particle size and a low apparent density. Dry blending of finely divided catalyst components can be effective if the components are available in small enough particle form. We have discovered a method for extending transition metal oxides upon inert or difficultly reducible supports which results in a suitably uniform distribution of transition metal oxide on the support while not deleteriously affecting the particle size or the bulk density of the resulting catalyst.

Our inventive technique involves the introduction of water to the support to such extent that the water is adsorbed on the support without producing a noticeable dampness or agglomeration and then mixing with such water-carrying support a quantity of a water-soluble or dispersible transition metal compound. The water adsorbed on the support facilitates rapid distribution of the transition metal compound over the support material which can then be calcined to yield a desired catalyst having a small particle size.

The supports useful in the practice of our invention are the inert or difficultly reducible metal oxides such as alumina, magnesia, titania, boria, zirconia, silica, or their composites, such as synthetic alumino-silicates, or their physical mixtures. By the term "difficultly reducible" we mean that the supports are such materials as are not reduced under the usual conditions for polymerization of ethylenically unsaturated hydrocarbons in the presence of the usual catalyst promoters known to this art. We have found that active catalysts can generally be prepared more readily with supports of small particle diameter, that is, less than 1 micron and, preferably, less than 0.2 micron. It also appears advantageous for these supports to have a low apparent density, for example, less than 0.1 gram per cubic centimeter. Suitable supports possess relatively high external surface area within the range of about 1 to 1,500 square meters per gram. Useful supports may be selected from materials having a surface area in the range of 50 to 1,000 m²/g. Our preferred supports have a particle diameter of 0.001 to 0.04 micron, and an apparent density of about 0.04 g./cc. with an external surface area from about 100 to 500 m²/g. These supports can be prepared by any method of subdivision which will produce material of small particle diameter and preferably having a low apparent density. Ultrasonic dispersion is one useful technique. Suitable commercial supports are available, such as silica supplied by Godfrey L. Cabot, designated Cab-O-Sil Grade M-5 and alumina from the same source, designated Alon-C.

The transition metal oxides useful in the practice of our invention are primarily those of metals of groups 5 and 6 of the periodic table. The oxides can be produced by calcination of a water-dispersible, preferably a water-soluble, transition metal compound on a support of the type described hereinabove. Suitable transition metal compounds exemplary of those useful in the practice of our invention are chromium trioxide, ammonium chromate, ammonium dichromate, sodium chromate, potassium chromate, sodium vanadate, ammonium vanadate, chromium triacetate, chromium nitrate nonahydrate and the like.

The amount of transition metal oxide to support is not a critical facet of our invention and may be varied through a wide range so long as each component is present in sufficient amount to produce a catalytically effective mix, a condition which is readily determined by simple experimentation. This is desirably at least about 0.1 percent by weight of either component and the usual metal oxide:support ratios are in the range of about 1:100 to 1:1.

The amount of water to be introduced to the support prior to mixing with the transition metal compound should be sufficient to effect a ready distribution of transition metal compound on support, but insufficient to cause clumping or agglomerating of the support, and in no case should be so great as to produce a noticeable wetness of the support. We have found that the amount of water carried by the support prior to treatment with a transition metal compound is desirably in the range of about 10 to about 40 percent by weight. This water can be introduced by simply exposing the support to water vapor in an enclosed atmosphere at room temperature or an elevated temperature until the support has adsorbed a desired amount of water. We have found it possible to easily effect the adsorption of a desirable amount of water by placing a dry support over water in a closed vessel, such as a desiccator in which the drying agent has been replaced by water, at room temperature and allowing it to equilibrate with the water vapor. It will be found that finely divided supports are more readily handled after adsorption of water vapor since the electrostatic charges which ordinarily create handling difficulties will be absent.

To prepare a catalyst in accordance with our invention it is necessary only to take a support containing adsorbed water and physically mix it with a water-dispersible or soluble transition metal compound. The resulting composition should then be calcined in air or other oxidizing atmosphere at a temperature of from about 200° C. to about 1,000° C. for from about 15 minutes to about 24 hours to activate it prior to use for polymerization. This treatment will remove adsorbed water which might otherwise in some instances have a deleterious effect upon the polymerization. We believe that this treatment may also effect a homogenization of the catalytic oxide on the support. In the case of some transition metal oxides, it may be desirable to follow the calcination with a reducing treatment in order to achieve maximum catalyst activity, as is known to the art.

The conditions for polymerization with our catalysts are those already known to the art, and the usual precautions against catalyst poisons should be taken when using catalysts made by our novel process.

The following experiments are set forth for the purpose of more specifically exemplifying our novel catalyst preparation to the workers in this art.

A sample of Cab-O-Sil silica, Grade M-5, was allowed to equilibrate with water vapor at 25° C. in a closed vessel for about 10 days. At the end of this time the adsorbed water amounted to 21.2 percent by weight of the treated material. The silica appeared dry and evidenced no change in particle size or apparent density, except as to the increase in weight resulting from the adsorbed water.

Ten grams of the silica containing adsorbed water were mixed with 0.330 g. of chromium trioxide in a Waring Blendor. Within 5 minutes a uniformly colored mixture resulted which contained 4.01 percent by weight chromium trioxide on a dry basis. This catalyst was oxygen-calcined over 1 hour, starting at a temperature of 25° C. and ending at 425° C.

A sample of catalyst prepared as described above was tested for polymerization activity with ethylene in n-heptane suspension and in the absence of diluent at 25° C. and under 1,100 p.s.i.g. ethylene pressure for 24 hours. In the solvent polymerization there was obtained a polyethylene yield amounting to 8,470 g. polymer/g. catalyst. In two experiments performed with no solvent, there was obtained an average yield of about 16,000 g. polymer/g. catalyst. Aluminum triisobutyl promoter was used in each run.

A sample of Cab-O-Sil silica Grade M-5 was exposed to water vapor until it had adsorbed 30.8 percent by weight of water. Despite this water content, the silica appeared dry. A catalyst containing 4.0 percent by weight chromium trioxide was made by mixing chromium trioxide with the water-carrying silica support and calcining the admixture in oxygen over 75 minutes, starting at a temperature of 25° C. and ending at 400° C.

A 0.0062 g. sample of the calcined catalyst was placed in a reaction bomb with 100 ml. n-heptane. To this was added 0.10 g. of aluminum triisobutyl. There was added 209 g. ethylene and polymerization was carried out at about room temperature under 1,250 p.s.i.g. ethylene for 24 hours. There was obtained 96.1 g. of n-heptane-insoluble polyethylene, representing a yield of 15,400 g. polymer/g. catalyst.

In similar fashion, a catalyst was prepared from vanadium pentoxide and Cab-O-Sil containing 10.3 weight percent water. This had a vanadium pentoxide content, after calcination, of 2.0 percent by weight. When this catalyst was used for the polymerization of ethylene in n-heptane solvent, for two hours at a maximum pressure of 1,435 p.s.i.g. ethylene and a maximum temperature of 87° C., there was obtained a solid polyethylene yield of about 7,000 g. polymer/g. catalyst.

Other transition metal compounds upon other supports as described herein within the scope of our invention can be used to prepare additional useful catalyst compositions in accordance with our process.

Having described our invention, what we claim is:

1. In a process for the preparation of a supported catalyst of a transition metal of groups 5 or 6 of the Periodic Table, the improvement which comprises:
   a. exposing an inert or difficultly reducible oxide support having a particle diameter of less than 1 micron and an apparent density of less than 0.1 g./cc to water vapor so as to cause the adsorption of sufficient water to promote the distribution of a transition metal compound of a metal of group 5 or 6 upon said support, the amount of said adsorbed water being within the range of from about 10 to about 40 percent by weight;
   b. mixing said exposed support with a water-dispersible or water-soluble transition metal compound of a metal of group 5 or 6; and
   c. calcining the resultant admixture at a temperature and for a time sufficient to remove said adsorbed water.

2. The process of claim 1 wherein said calcining is effected at a temperature within the range of from about 200° C. to about 1,000° C. for a period of time of from about 0.25 to about 24 hours.

3. The process of claim 2 wherein said transition metal compound is a chromium compound.

4. The process of claim 2 wherein said transition metal compound is a vanadium compound.

* * * * *